US009705744B2

(12) United States Patent
Geiger et al.

(10) Patent No.: US 9,705,744 B2
(45) Date of Patent: Jul. 11, 2017

(54) UPDATING HARDWARE AND SOFTWARE COMPONENTS OF CLOUD COMPUTING ENVIRONMENT AT OPTIMAL TIMES

(71) Applicant: International Business Machines Corporation, Armonk, NY (US)

(72) Inventors: Adam R. Geiger, Cary, NC (US); Hugh E. Hockett, Raleigh, NC (US); Edward M. Howard, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 531 days.

(21) Appl. No.: 13/935,903

(22) Filed: Jul. 5, 2013

(65) Prior Publication Data

US 2015/0012624 A1    Jan. 8, 2015

(51) Int. Cl.
  *G06F 15/177* (2006.01)
  *H04L 12/24* (2006.01)
  *H04L 12/26* (2006.01)

(52) U.S. Cl.
  CPC ........ *H04L 41/082* (2013.01); *H04L 43/0817* (2013.01)

(58) Field of Classification Search
  CPC ...... G06F 3/0632; G06F 3/0617; G06F 1/329; H04L 41/0833; G06Q 10/0631
  (Continued)

(56) References Cited

U.S. PATENT DOCUMENTS 6,477,642 B1 *  11/2002  Lupo .................... G06F 9/4401
                                        713/1
7,280,529 B1 * 10/2007  Black .................. G06F 11/1433
                                        370/352
(Continued)

OTHER PUBLICATIONS

Mell et al., "The NIST Definition of Cloud Computing," Special Publication 800-145, Sep. 2011.
(Continued)

*Primary Examiner* — Kevin Bates
*Assistant Examiner* — Ronak Patel
(74) *Attorney, Agent, or Firm* — Robert A. Voigt, Jr.; Winstead, P.C.

(57) ABSTRACT

A method, system and computer program product for updating hardware and software components of a cloud computing environment. An administrative server monitors the usage statistics (e.g., compute utilization) of the hardware and software components of the cloud computing environment. Upon receiving user-selected thresholds for the usage statistics, which may be stored in a profile, the administrative server applies a user-provided patch to the hardware or software component whose threshold criteria has been met. Alternatively, the administrative server may automatically update the hardware and software components based on determined minimum usage points (i.e., minimum levels of usage activity) using the monitored usage statistics of the hardware and software components. In this manner, updates to the hardware and software components of the cloud computing environment can occur at optimal times, where the usage activity is low, thereby lessening the negative impact on servicing the user's computing requirements from the update.

6 Claims, 9 Drawing Sheets

(58) Field of Classification Search
USPC .......................................................... 709/221
See application file for complete search history.

(56) References Cited

U.S. PATENT DOCUMENTS

| | | | |
|---|---|---|---|
| 8,261,353 B2 | 9/2012 | Hirsave et al. | |
| 2006/0080656 A1* | 4/2006 | Cain .................... | G06F 8/65 717/174 |
| 2006/0130042 A1 | 6/2006 | Dias et al. | |
| 2007/0169089 A1* | 7/2007 | Bantz .................... | G06F 9/4425 717/168 |
| 2007/0192763 A1* | 8/2007 | Helvick ................ | G06F 8/65 717/168 |
| 2008/0148268 A1 | 6/2008 | Hirouchi | |
| 2009/0187899 A1* | 7/2009 | Mani ..................... | G06F 8/65 717/168 |
| 2010/0017259 A1* | 1/2010 | Luo ...................... | G06Q 30/02 705/7.35 |
| 2010/0229166 A1* | 9/2010 | Mopur .................. | G06F 3/0617 717/168 |
| 2012/0011035 A1* | 1/2012 | Calcaterra ........... | G06F 11/0709 705/34 |
| 2012/0116743 A1* | 5/2012 | Ayala .................. | G06F 17/30557 703/13 |
| 2012/0290862 A1* | 11/2012 | Brown .................. | G06F 1/329 713/320 |

OTHER PUBLICATIONS

Aversano et al., "Automating the Management of Software Maintenance Workflows in a Large Software Enterprise: a Case Study," http://onlinelibrary.wiley.com/doi/10.1002/smr.253/abstract, Aug. 23, 2002.

"IBM Endpoint Manager for Patch Management," http://www-01.ibm.com/software/tivoli/products/endpoint-patch-mgmt/, 2011.

"Rewriting the Rules of Patch Management," http://public.dhe.ibm.com/common/ssi/ecm/en/tiw14065usen/TIW14065USEN.PDF, Feb. 2011.

* cited by examiner

UPDATING HARDWARE AND SOFTWARE COMPONENTS OF CLOUD COMPUTING ENVIRONMENT AT OPTIMAL TIMES

TECHNICAL FIELD

The present invention relates generally to cloud computing, and more particularly to updating the hardware and software components of the cloud computing environment at optimal times.

BACKGROUND

In a cloud computing environment, computing is delivered as a service rather than a product, whereby shared resources, software and information are provided to computers and other devices as a metered service over a network, such as the Internet. In such an environment, computation, software, data access and storage services are provided to users that do not require knowledge of the physical location and configuration of the system that delivers the services.

The functions of the cloud computing environment are performed by a data center, which includes many types of hardware components (e.g., storage controllers, network switches, physical compute machines) and software components. These components will eventually need to be updated, such as updating them with a patch (a patch refers to software designed to fix problems with or update a computer program or its supporting data). When these components are updated, the components may be negatively affected in servicing the user's computing requirements. As a result, the components should be updated at times that are minimally intrusive to servicing the user's computing requirements. Currently, however, there is not a means for updating these components at the most optimal time, such as updating them when they are minimally being used thereby lessening the negative impact in servicing the user's computing requirements from the update.

BRIEF SUMMARY

In one embodiment of the present invention, a method for updating hardware and software components of a cloud computing environment comprises monitoring usage statistics of the hardware and software components of the cloud computing environment. The method further comprises receiving user-selected thresholds for usage statistics of one or more of the monitored hardware and software components to be used to determine when to apply a patch. In addition, the method comprises applying, by a processor, the patch to a hardware or software component of the cloud computing environment in response to a monitored usage statistic of the hardware or software component meeting a user-selected threshold for the monitored usage statistic.

Other forms of the embodiment of the method described above are in a system and in a computer program product.

In another embodiment of the present invention, a method for updating hardware and software components of a cloud computing environment comprises monitoring usage statistics of the hardware and software components of the cloud computing environment over a period of time. The method further comprises determining minimum usage points of activity for the hardware and software components based on the monitored usage statistics over the period of time. In addition, the method comprises updating, by a processor, a hardware or software component of the cloud computing environment with a patch at a determined minimum usage point for the hardware or software component.

Other forms of the embodiment of the method described above are in a system and in a computer program product.

The foregoing has outlined rather generally the features and technical advantages of one or more embodiments of the present invention in order that the detailed description of the present invention that follows may be better understood. Additional features and advantages of the present invention will be described hereinafter which may form the subject of the claims of the present invention.

BRIEF DESCRIPTION OF THE SEVERAL VIEWS OF THE DRAWINGS

A better understanding of the present invention can be obtained when the following detailed description is considered in conjunction with the following drawings, in which.

DETAILED DESCRIPTION

Figure 1:
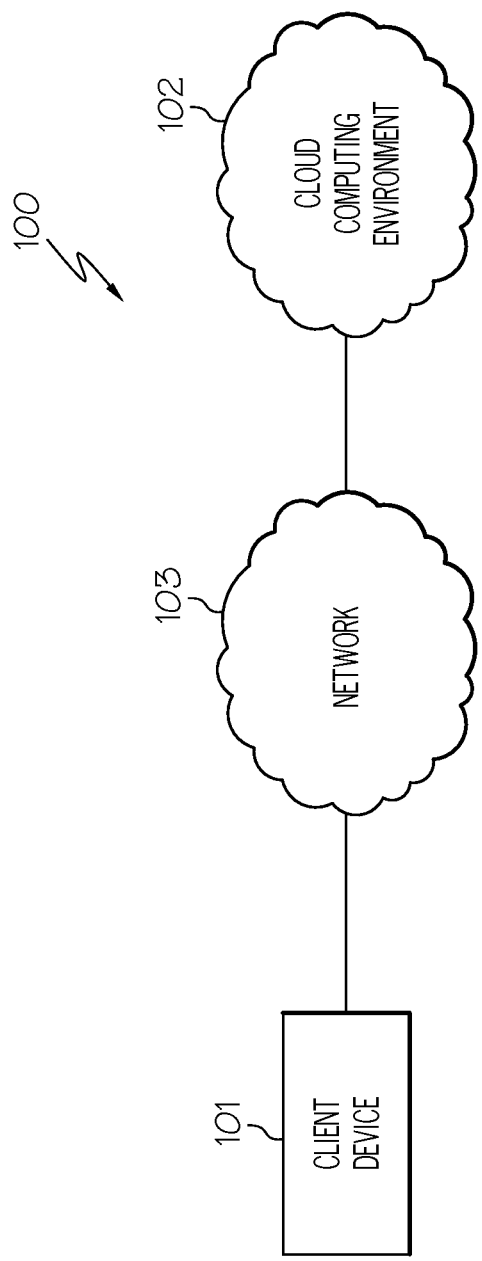
FIG. 1 illustrates a network system configured in accordance with an embodiment of the present invention.

The present invention comprises a method, system and computer program product for updating hardware and software components of a cloud computing environment. In one embodiment of the present invention, an administrative server monitors the usage statistics of the hardware and software components of the cloud computing environment. Usage statistics (e.g., compute utilization, network utilization, storage utilization) refers to the collection of data relating to the usage or utilization of the hardware and software components of the cloud computing environment. Upon receiving user-selected thresholds for the usage statistics, which may be stored in a profile, the administrative server determines whether the threshold criteria for the monitored usage statistic of the hardware or software component has been met. If the threshold criteria for the monitored usage statistic of a hardware or software component has been met, then the administrative server applies a user-provided patch to the hardware or software component of the cloud computing environment whose threshold criteria has been met. Alternatively, the administrative server may automatically update the hardware and software components of the cloud computing environment based on determined minimum usage points (i.e., minimum levels of usage activity) using the monitored usage statistics of the hardware and software components. In this manner, by using user-specified threshold criteria for the monitored usage statistics, or by having the administrative server determine components' minimal usage times, updates to the hardware and software components of the cloud computing environment can occur at optimal times, where the usage activity is low, thereby lessening the negative impact on servicing the user's computing requirements from the update.

In the following description, numerous specific details are set forth to provide a thorough understanding of the present invention. However, it will be apparent to those skilled in the art that the present invention may be practiced without such specific details. In other instances, well-known circuits have been shown in block diagram form in order not to obscure the present invention in unnecessary detail. For the most part, details considering timing considerations and the like have been omitted inasmuch as such details are not necessary to obtain a complete understanding of the present invention and are within the skills of persons of ordinary skill in the relevant art.

It is understood in advance that although this disclosure includes a detailed description on cloud computing, implementation of the teachings recited herein are not limited to a cloud computing environment. Rather, the embodiments of the present invention are capable of being implemented in conjunction with any type of clustered computing environment now known or later developed.

In any event, the following definitions have been derived from the "The NIST Definition of Cloud Computing" by Peter Mell and Timothy Grance, dated September 2011, which is cited on an Information Disclosure Statement filed herewith, and a copy of which is provided to the U.S. Patent and Trademark Office.

Cloud computing is a model for enabling ubiquitous, convenient, on-demand network access to a shared pool of configurable computing resources (e.g., networks, servers, storage, applications, and services) that can be rapidly provisioned and released with minimal management effort or service provider interaction. This cloud model is composed of five essential characteristics, three service models, and four deployment models.

Characteristics are as follows:

On-Demand Self-Service: A consumer can unilaterally provision computing capabilities, such as server time and network storage, as needed, automatically without requiring human interaction with each service's provider.

Broad Network Access: Capabilities are available over a network and accessed through standard mechanisms that promote use by heterogeneous thin or thick client platforms (e.g., mobile phones, tablets, laptops and workstations).

Resource Pooling: The provider's computing resources are pooled to serve multiple consumers using a multi-tenant model, with different physical and virtual resources dynamically assigned and reassigned according to consumer demand. There is a sense of location independence in that the consumer generally has no control or knowledge over the exact location of the provided resources but may be able to specify location at a higher level of abstraction (e.g., country, state or data center). Examples of resources include storage, processing, memory and network bandwidth.

Rapid Elasticity: Capabilities can be elastically provisioned and released, in some cases automatically, to scale rapidly outward and inward commensurate with demand. To the consumer, the capabilities available for provisioning often appear to be unlimited and can be purchased in any quantity at any time.

Measured Service: Cloud systems automatically control and optimize resource use by leveraging a metering capability at some level of abstraction appropriate to the type of service (e.g., storage, processing, bandwidth and active user accounts). Resource usage can be monitored, controlled and reported providing transparency for both the provider and consumer of the utilized service.

Service Models are as follows:

Software as a Service (SaaS): The capability provided to the consumer is to use the provider's applications running on a cloud infrastructure. The applications are accessible from various client devices through either a thin client interface, such as a web browser (e.g., web-based e-mail) or a program interface. The consumer does not manage or control the underlying cloud infrastructure including network, servers, operating systems, storage, or even individual application capabilities, with the possible exception of limited user-specific application configuration settings.

Platform as a Service (PaaS): The capability provided to the consumer is to deploy onto the cloud infrastructure consumer-created or acquired applications created using programming languages, libraries, services and tools supported by the provider. The consumer does not manage or control the underlying cloud infrastructure including networks, servers, operating systems or storage, but has control over the deployed applications and possibly configuration settings for the application-hosting environment.

Infrastructure as a Service (IaaS): The capability provided to the consumer is to provision processing, storage, networks and other fundamental computing resources where the consumer is able to deploy and run arbitrary software, which can include operating systems and applications. The consumer does not manage or control the underlying cloud infrastructure but has control over operating systems, storage and deployed applications; and possibly limited control of select networking components (e.g., host firewalls).

Deployment Models are as follows:

Private Cloud: The cloud infrastructure is provisioned for exclusive use by a single organization comprising multiple consumers (e.g., business units). It may be owned, managed and operated by the organization, a third party or some combination of them, and it may exist on or off premises.

Community Cloud: The cloud infrastructure is provisioned for exclusive use by a specific community of consumers from organizations that have shared concerns (e.g., mission, security requirements, policy and compliance considerations). It may be owned, managed and operated by one or more of the organizations in the community, a third party, or some combination of them, and it may exist on or off premises.

Public Cloud: The cloud infrastructure is provisioned for open use by the general public. It may be owned, managed and operated by a business, academic or government organization, or some combination of them. It exists on the premises of the cloud provider.

Hybrid Cloud: The cloud infrastructure is a composition of two or more distinct cloud infrastructures (private, community or public) that remain unique entities, but are bound together by standardized or proprietary technology that enables data and application portability (e.g., cloud bursting for load balancing between clouds).

Referring now to the Figures in detail, FIG. 1 illustrates a network system 100 configured in accordance with an embodiment of the present invention. Network system 100 includes a client device 101 connected to a cloud computing environment 102 via a network 103. Client device 101 may be any type of computing device (e.g., portable computing unit, Personal Digital Assistant (PDA), smartphone, laptop computer, mobile phone, navigation device, game console, desktop computer system, workstation, Internet appliance and the like) configured with the capability of connecting to cloud computing environment 102 via network 103.

Network 103 may be, for example, a local area network, a wide area network, a wireless wide area network, a circuit-switched telephone network, a Global System for Mobile Communications (GSM) network, Wireless Application Protocol (WAP) network, a WiFi network, an IEEE 802.11 standards network, various combinations thereof, etc. Other networks, whose descriptions are omitted here for brevity, may also be used in conjunction with system 100 of FIG. 1 without departing from the scope of the present invention.

Cloud computing environment 102 is used to deliver computing as a service to client device 101 implementing the model discussed above. An embodiment of cloud computing environment 102 is discussed below in connection with FIG. 2.

Figure 2:
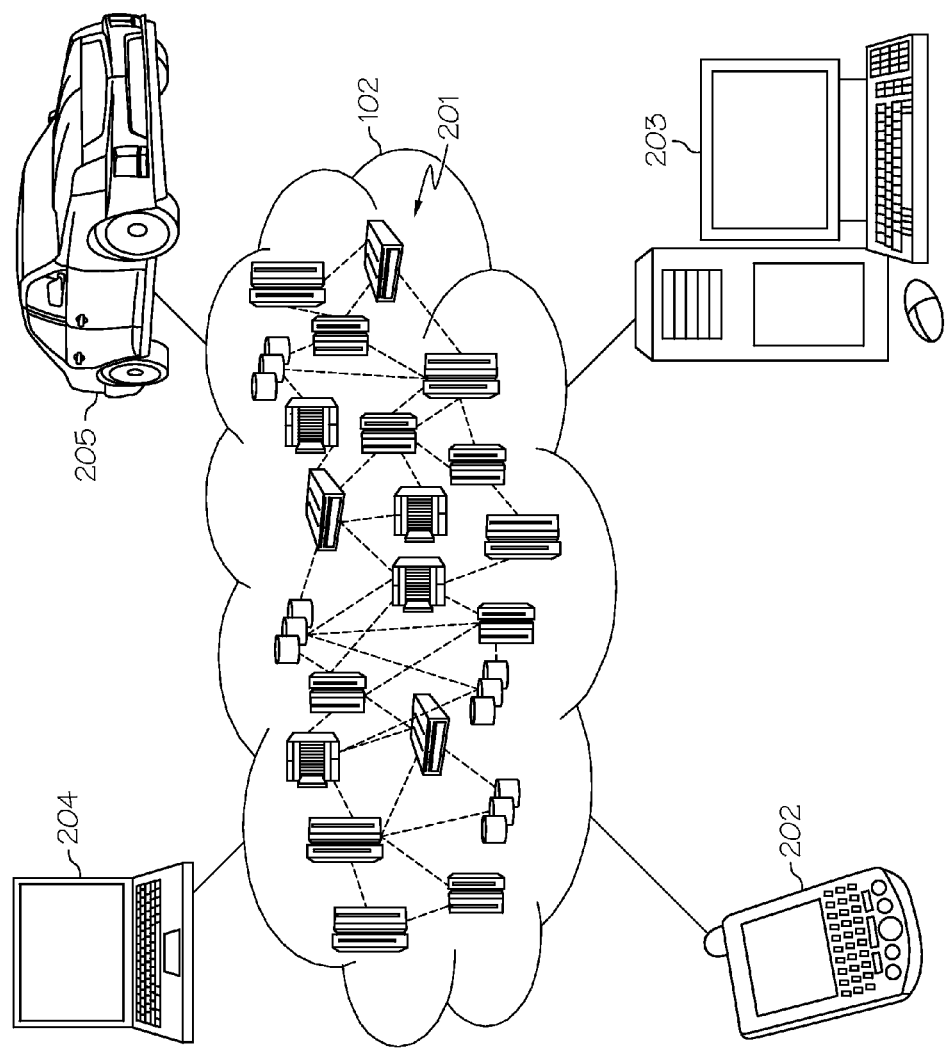
FIG. 2 illustrates a cloud computing environment in accordance with an embodiment of the present invention.

FIG. 2 illustrates cloud computing environment 102 in accordance with an embodiment of the present invention. As shown, cloud computing environment 102 includes one or more cloud computing nodes 201 (also referred to as "clusters") with which local computing devices used by cloud consumers, such as, for example, Personal Digital Assistant (PDA) or cellular telephone 202, desktop computer 203, laptop computer 204, and/or automobile computer system 205 may communicate. Nodes 201 may communicate with one another. They may be grouped (not shown) physically or virtually, in one or more networks, such as Private, Community, Public, or Hybrid clouds as described hereinabove, or a combination thereof. This allows cloud computing environment 102 to offer infrastructure, platforms and/or software as services for which a cloud consumer does not need to maintain resources on a local computing device. A description of a schematic of exemplary cloud computing nodes 201 is provided below in connection with FIG. 3. It is understood that the types of computing devices 202, 203, 204, 205 shown in FIG. 2, which may represent client device 101 of FIG. 1, are intended to be illustrative and that cloud computing nodes 201 and cloud computing environment 102 can communicate with any type of computerized device over any type of network and/or network addressable connection (e.g., using a web browser). Program code located on one of nodes 201 may be stored on a computer recordable storage medium in one of nodes 201 and downloaded to computing devices 202, 203, 204, 205 over a network for use in these computing devices. For example, a server computer in computing node 201 may store program code on a computer readable storage medium on the server computer. The server computer may download the program code to computing device 202, 203, 204, 205 for use on the computing device.

Figure 3:
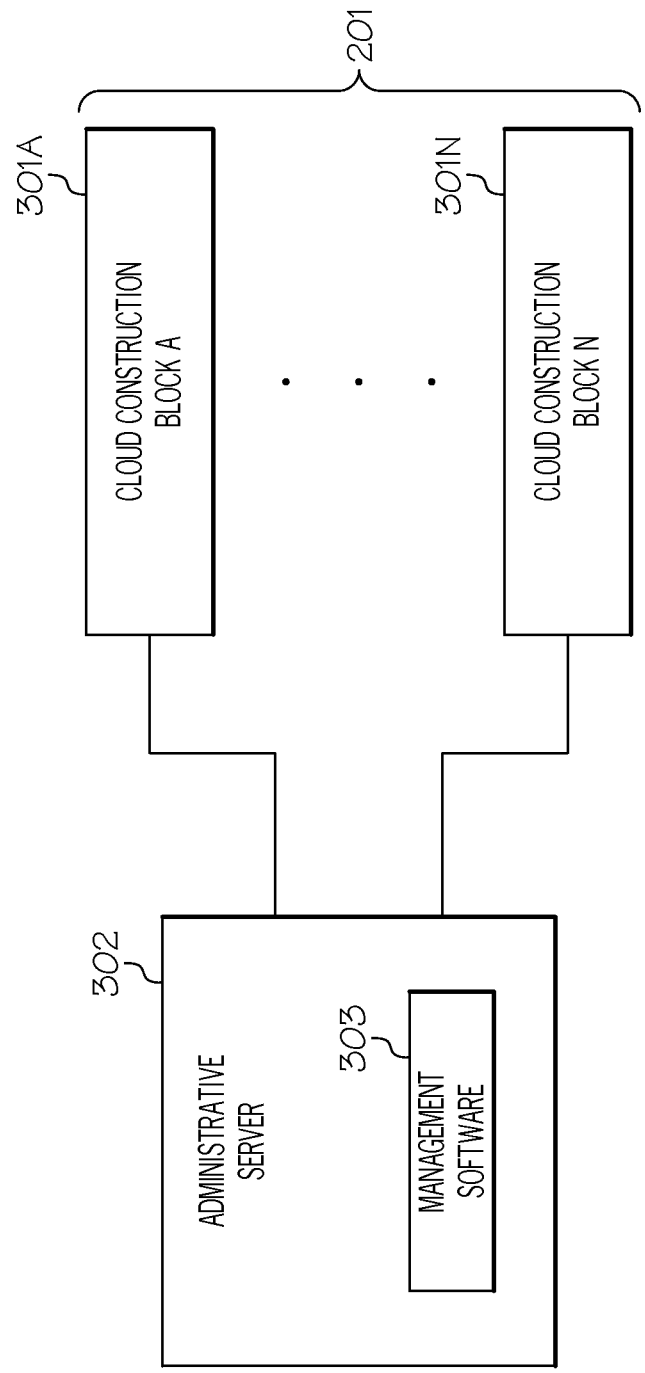
FIG. 3 illustrates a cloud computing node comprised of one or more cloud construction blocks in accordance with an embodiment of the present invention.

Referring now to FIG. 3, FIG. 3 illustrates a schematic of a cloud computing node 201 (FIG. 2) comprised of one or more "cloud construction blocks" 301A-301N (N is a positive integer number) in accordance with an embodiment of the present invention. Cloud construction blocks 301A-301N may collectively or individually be referred to as cloud construction blocks 301 or cloud construction block 301, respectively. Each cloud construction block 301 may be represented by a single unit that includes various types of hardware components (e.g., storage controllers, network switches, physical compute machines) as discussed further below in connection with FIG. 4.

Furthermore, as illustrated in FIG. 3, each cloud construction block 301 is connected to an administrative server 302 configured to provide data center-level functions. Administrative server 302 supports a module, referred to herein as the management software 303, that can be used to manage the hardware components of cloud computing nodes 201, monitor system utilization, intelligently deploy images of data and optimize the operations of cloud computing environment 102. Furthermore, management software 303 can be used to update the hardware and software components of cloud computing environment 102 (FIG. 1) at optimal times, such as updating them when they are minimally being used thereby lessening the negative impact in servicing the user's computing requirements from the update, as discussed further below in connection with FIGS. 7-9. A description of the hardware configuration of administrative server 302 is provided further below in connection with FIG. 6.

Figure 4:
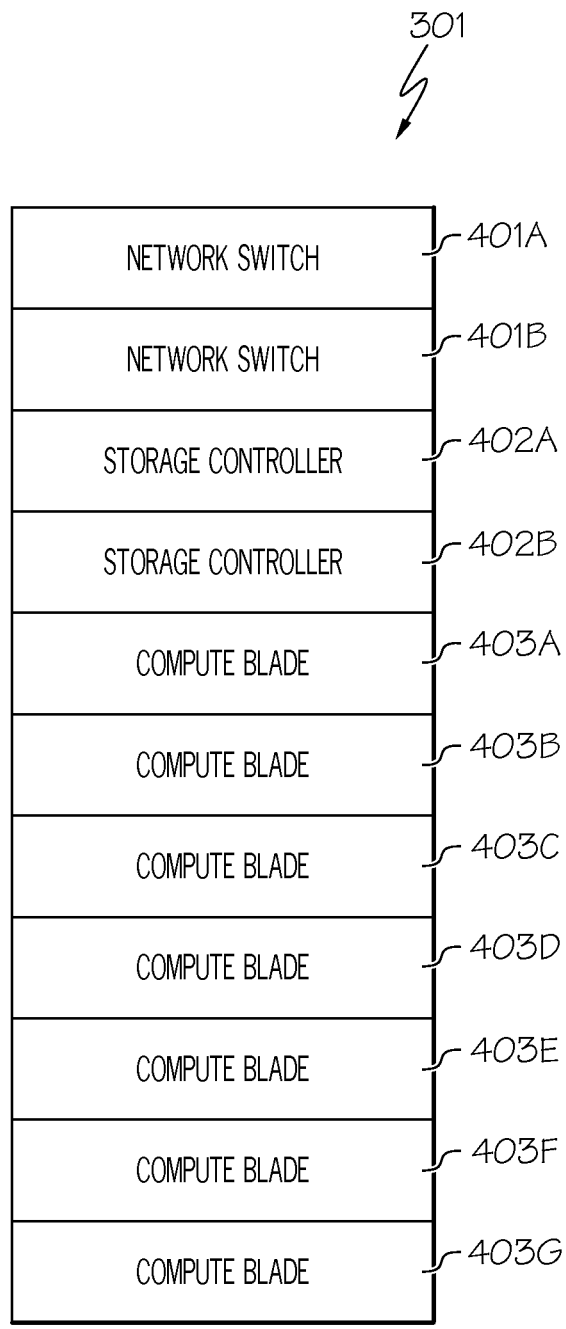
FIG. 4 illustrates a physical layout of a cloud construction block in accordance with an embodiment of the present invention.

Referring now to FIG. 4, FIG. 4 illustrates a physical layout of a cloud construction block 301 (FIG. 3) in accordance with an embodiment of the present invention. Referring to FIG. 4, cloud construction block 301 may comprise a rack of many units containing network hardware (e.g., network switches 401A, 401B), storage hardware (e.g., storage controllers 402A, 402B), and compute hardware (e.g., compute blades 403A-403G). Network switches 401-401B may collectively or individually be referred to as network switches 401 or network switch 401, respectively. Storage controllers 402A-402B may collectively or individually be referred to as storage controllers 402 or storage controller 402, respectively. Compute blades 403A-403G may collectively or individually be referred to as compute blades 403 or compute blade 403, respectively. A virtualization environment for compute blade 403 (e.g., blade server) is discussed further below in connection with FIG. 5.

While FIG. 4 illustrates cloud construction block 301 as comprising a particular number of network switches 401, storage controllers 402 and compute blades 403, cloud construction block 301 is not to be limited in scope to the particular number of components depicted in FIG. 4. Furthermore, cloud construction block 301 may include other components, including software, that were not depicted for ease of understanding the principles of the present invention.

Figure 5:
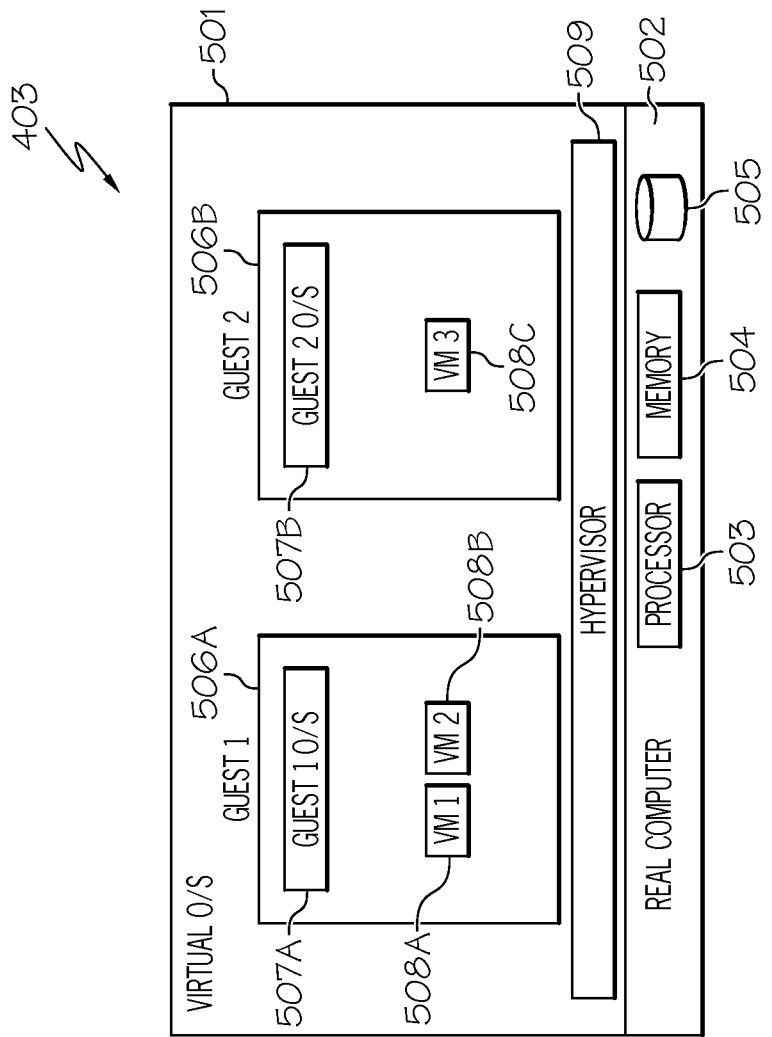
FIG. 5 illustrates a virtualization environment for a compute blade in accordance with an embodiment of the present invention.

Referring now to FIG. 5, FIG. 5 illustrates a virtualization environment for compute blade 403 (FIG. 4) in accordance with an embodiment of the present invention. Compute blade 403 includes a virtual operating system 501. Operating system 501 executes on a real or physical computer 502. Real computer 502 includes one or more processors 503, a memory 504 (also referred to herein as the host physical memory), one or more disk drives 505 and the like. Other components of real computer 502 are not discussed herein for the sake of brevity.

Virtual operating system 501 further includes user portions 506A-506B (identified as "Guest 1" and "Guest 2," respectively, in FIG. 5), referred to herein as "guests." Each guest 506A, 506B is capable of functioning as a separate system. That is, each guest 506A-506B can be independently reset, host a guest operating system 507A-507B, respectively, (identified as "Guest 1 O/S" and "Guest 2 O/S,"

respectively, in FIG. 5) and operate with different programs. An operating system or application program running in guest 506A, 506B appears to have access to a full and complete system, but in reality, only a portion of it is available. Guests 506A-506B may collectively or individually be referred to as guests 506 or guest 506, respectively. Guest operating systems 507A-507B may collectively or individually be referred to as guest operating systems 507 or guest operating system 507, respectively.

Each guest operating system 507A, 507B may host one or more virtual machine applications 508A-508C (identified as "VM 1," "VM 2" and "VM 3," respectively, in FIG. 5), such as Java™ virtual machines. For example, guest operating system 507A hosts virtual machine applications 508A-508B. Guest operating system 507B hosts virtual machine application 508C. Virtual machines 508A-508C may collectively or individually be referred to as virtual machines 508 or virtual machine 508, respectively.

Virtual operating system 501 further includes a common base portion 509, referred to herein as a hypervisor. Hypervisor 509 may be implemented in microcode running on processor 503 or it may be implemented in software as part of virtual operating system 501. Hypervisor 509 is configured to manage and enable guests 506 to run on a single host.

As discussed above, virtual operating system 501 and its components execute on physical or real computer 502. These software components may be loaded into memory 504 for execution by processor 503.

The virtualization environment for compute blade 403 is not to be limited in scope to the elements depicted in FIG. 5. The virtualization environment for compute blade 403 may include other components that were not discussed herein for the sake of brevity.

Figure 6:
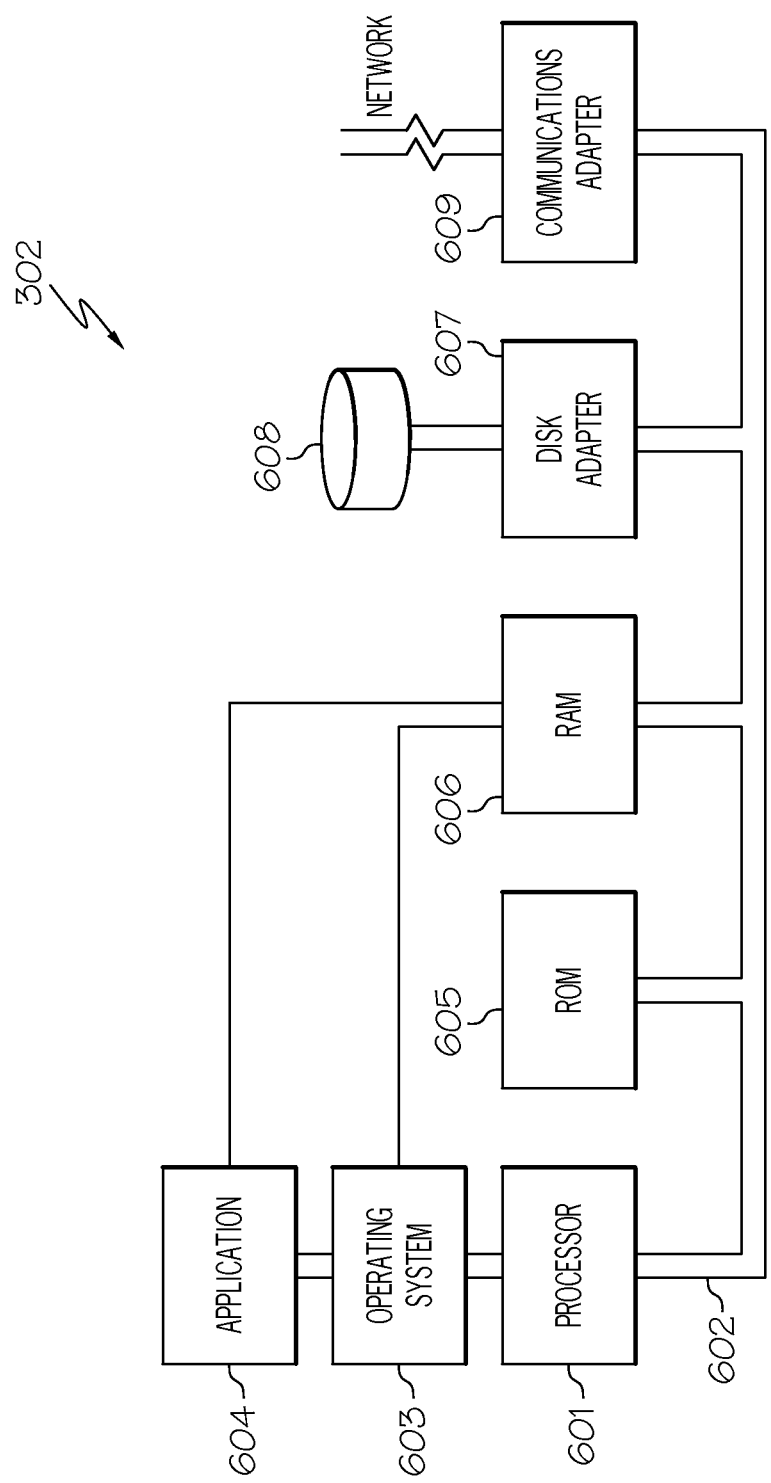
FIG. 6 illustrates a hardware configuration of an administrative server configured in accordance with an embodiment of the present invention.

Referring now to FIG. 6, FIG. 6 illustrates a hardware configuration of administrative server 302 (FIG. 3) which is representative of a hardware environment for practicing the present invention. Administrative server 302 has a processor 601 coupled to various other components by system bus 602. An operating system 603 runs on processor 601 and provides control and coordinates the functions of the various components of FIG. 6. An application 604 in accordance with the principles of the present invention runs in conjunction with operating system 603 and provides calls to operating system 603 where the calls implement the various functions or services to be performed by application 604. Application 604 may include, for example, a program for updating the hardware and software components of cloud computing environment 102 (FIG. 1) at optimal times, such as updating them when they are minimally being used thereby lessening the negative impact in servicing the user's computing requirements from the update, as discussed further below in connection with FIGS. 7-9.

Referring again to FIG. 6, read-only memory ("ROM") 605 is coupled to system bus 602 and includes a basic input/output system ("BIOS") that controls certain basic functions of administrative server 302. Random access memory ("RAM") 606 and disk adapter 607 are also coupled to system bus 602. It should be noted that software components including operating system 603 and application 604 may be loaded into RAM 606, which may be administrative server's 302 main memory for execution. Disk adapter 607 may be an integrated drive electronics ("IDE") adapter that communicates with a disk unit 608, e.g., disk drive. It is noted that the program for updating the hardware and software components of cloud computing environment 102 at optimal times, as discussed further below in connection with FIGS. 7-9, may reside in disk unit 608 or in application 604.

Administrative server 302 may further include a communications adapter 609 coupled to bus 602. Communications adapter 609 interconnects bus 602 with an outside network (e.g., network 103 of FIG. 1).

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," 'module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or flash memory), a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the C programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the present invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the function/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the function/acts specified in the flowchart and/or block diagram block or blocks.

As stated in the Background section, the functions of the cloud computing environment are performed by a data center, which includes many types of hardware components (e.g., storage controllers, network switches, physical compute machines) and software components. These components will eventually need to be updated, such as updating them with a patch (a patch refers to software designed to fix problems with or update a computer program or its supporting data). When these components are updated, the components may be negatively affected in servicing the user's computing requirements. As a result, the components should be updated at times that are minimally intrusive to servicing the user's computing requirements. Currently, however, there is not a means for updating these components at the most optimal time, such as updating them when they are minimally being used thereby lessening the negative impact in servicing the user's computing requirements from the update.

Figure 7:
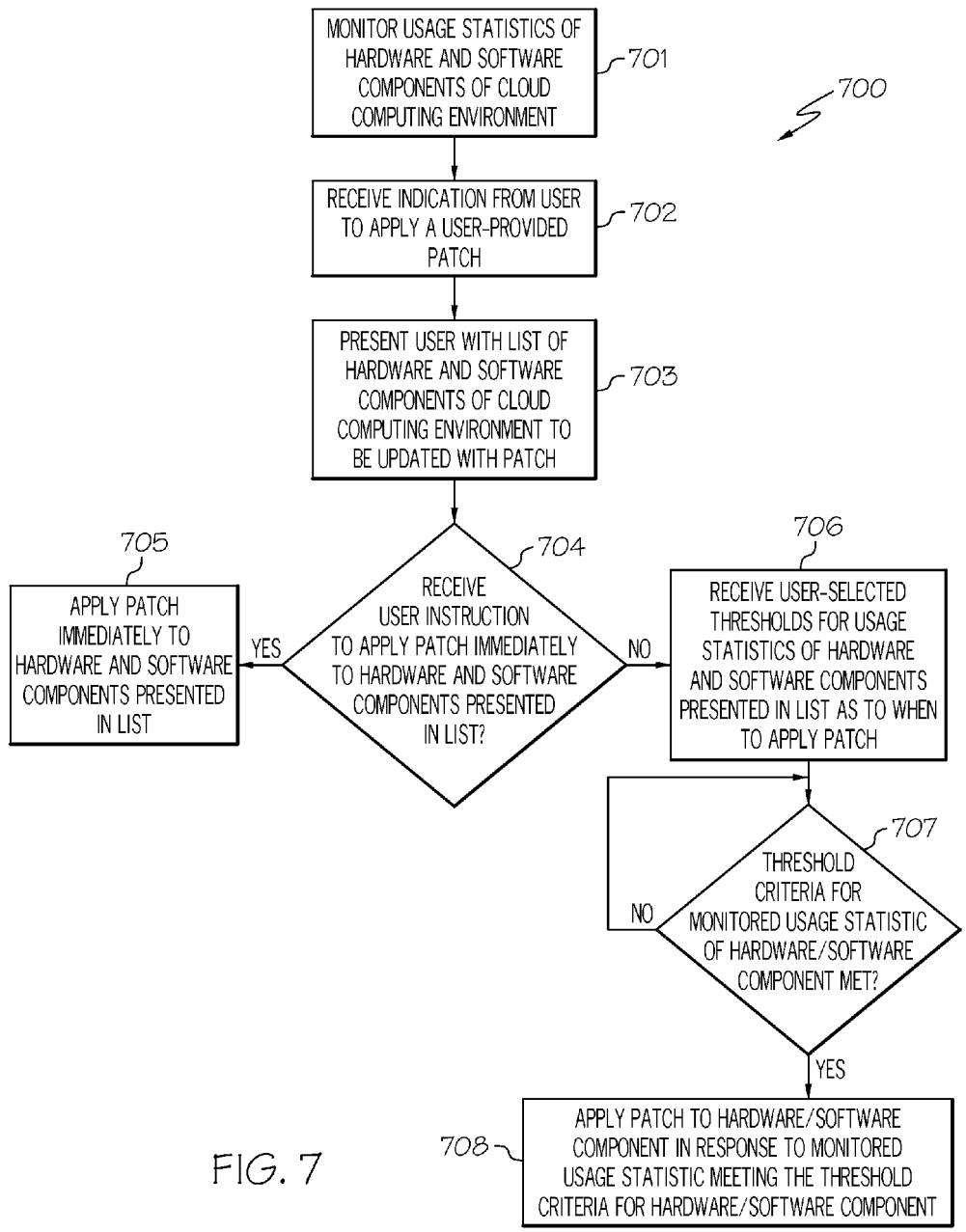
FIG. 7 is a flowchart of a method for updating the hardware and software components of the cloud computing environment using user-specified threshold criteria for the usage statistics of the hardware and software components in accordance with an embodiment of the present invention.
Figure 8:
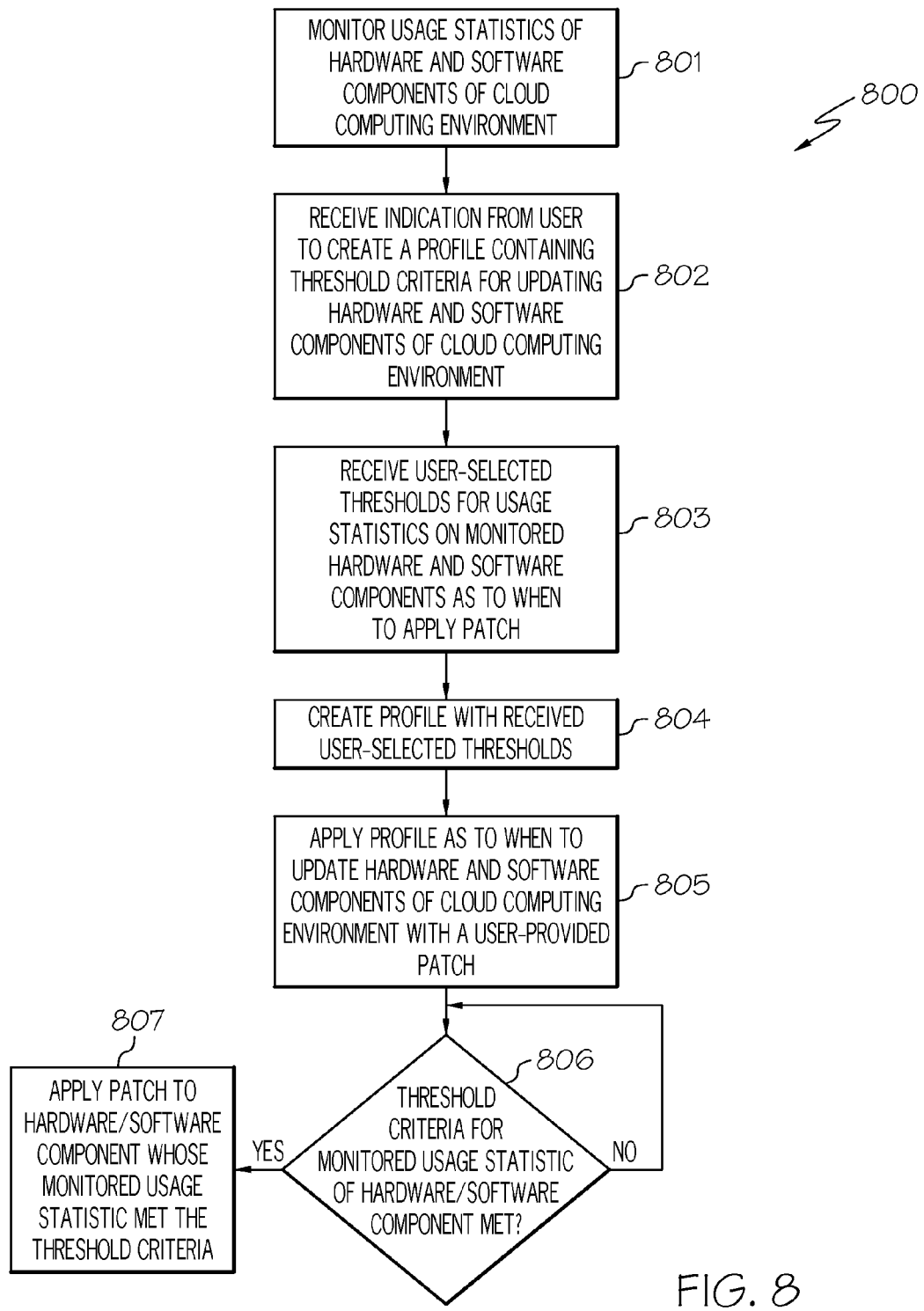
FIG. 8 is a flowchart of a method for updating the hardware and software components of the cloud computing environment using a profile containing user-specified threshold criteria for the usage statistics of the hardware and software components in accordance with an embodiment of the present invention.
Figure 9:
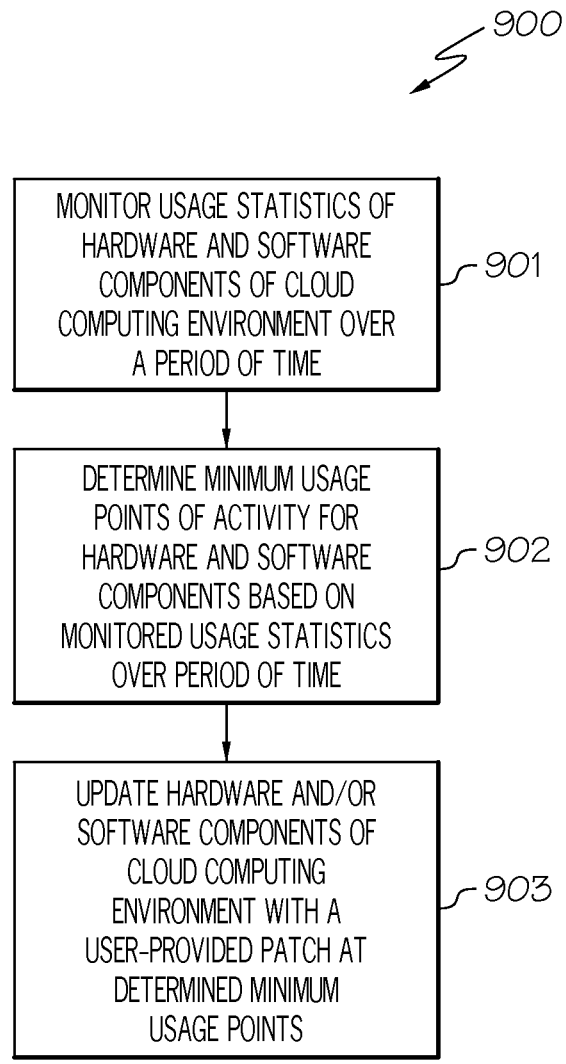
FIG. 9 is a flowchart of a method for automatically updating the hardware and software components of the cloud computing environment at determined minimum usage points in accordance with an embodiment of the present invention.

The principles of the present invention provide a means for updating hardware and software components of cloud computing environment 102 (FIG. 1) at optimal times, such as updating them when they are minimally being used thereby lessening the negative impact in servicing the user's computing requirements from the update, using user-specified threshold criteria for the usage statistics of the hardware and software components or based on trends for the usage statistics of the hardware and software components as discussed further below in connection with FIGS. 7-9. FIG. 7 is a flowchart of a method for updating hardware and software components of cloud computing environment 102 using user-specified threshold criteria for the usage statistics of the hardware and software components. FIG. 8 is a flowchart of a method for updating hardware and software components of cloud computing environment 102 using a profile containing user-specified threshold criteria for the usage statistics of the hardware and software components. FIG. 9 is a flowchart of a method for automatically updating hardware and software components of cloud computing environment 102 at determined minimum usage points.

As stated above, FIG. 7 is a flowchart of a method 700 for updating hardware and software components of cloud computing environment 102 (FIG. 1) using user-specified threshold criteria for the usage statistics of the hardware and software components in accordance with an embodiment of the present invention.

Referring to FIG. 7, in conjunction with FIGS. 1-6, in step 701, administrative server 302 monitors the usage statistics for both the hardware components (e.g., network switches 401, storage controllers 402, compute blades 403) and software components of cloud computing environment 102. Usage statistics refers to the collection of data relating to the usage or utilization of the hardware and software components of cloud computing environment 102. For example, usage statistics may include compute utilization, such as processor utilization, memory utilization and the number of virtual machines currently being utilized; storage utilization, such as disk utilization and volume utilization for individual virtual machines 508; network utilization, such as port usages and virtual adapter usages; power utilization and temperature. Such usage statistics may be used to determine minimum levels of activity of the hardware and software components, and therefore, the optimal time to update the hardware or software component. For example, it may be more opportune to update the firmware on compute blade 403 (e.g., blade server) with a patch when the processor utilization of compute blade 403 is at a low level than when the processor utilization of compute blade 403 is at a higher level. By updating the firmware on compute blade 403 at a low level of activity, the update should have a less negative impact on servicing the user's computing requirements.

In step 702, administrative server 302 receives an indication from the user (e.g., user of client device 101) to apply a user-provided patch, where a patch refers to software designed to fix problems with or update a computer program or its supporting data.

In step 703, administrative server 302 presents the user a list of the hardware and software components of cloud computing environment 102 to be updated with the patch. In one embodiment, the hardware and software components presented in the list are automatically generated by administrative server 302 based on the components that would likely be updated with the user-provided patch. In one embodiment, the user indicates the particular hardware and software components to be updated with the user-provided patch which is used by administrative server 302 to generate and present a list of such hardware and software components of cloud computing environment 102 to be updated with the patch.

In step 704, a determination is made by administrative server 302 as to whether it received user-provided instructions to apply the patch immediately to the hardware and software components presented in the list.

If the user provides instructions to apply the patch immediately to the hardware and software components presented in the list, then, in step 705, administrative server 302 applies the patch immediately to the hardware and software components presented in the list.

If, however, the user does not provide instructions to apply the patch immediately to the hardware and software components presented in the list, then, in step 706, administrative server 302 receives user-selected thresholds for the usage statistics of the hardware and software components presented in the list, where the user-selected thresholds will be used to determine when to apply the patch. In one embodiment, the user-provided thresholds are defined using a time value. For example, a user-specified threshold may relate to updating a hardware/software component (e.g., firmware) when the processor utilization of compute blade 403 is below the average utilization by 20% over a five (5) minute period. Hence, if the processor utilization drops below the average utilization by 20% over the five (5) minute period, then it would be an optimal time to update the firmware on compute blade 403 according to the user.

In step 707, a determination is made by administrative server 302 as to whether the threshold criteria (threshold criteria provided in step 706) for the monitored usage statistic of a hardware or software component has been met. If the threshold criteria for the monitored usage statistic of a hardware or software component has not been met, then administrative server 302 continues to determine whether the threshold criteria (threshold criteria provided in step 706) for the monitored usage statistic of a hardware or software component has been met in step 707.

If, however, the threshold criteria (threshold criteria provided in step 706) for the monitored usage statistic of a hardware or software component has been met, then, in step 708, administrative server 302 applies the patch to the hardware or software component of cloud computing environment 102 whose threshold criteria has been met. In this manner, by using user-specified threshold criteria for the monitored usage statistics, updates to hardware and software components of cloud computing environment 102 can occur at user-indicated optimal times, where the usage activity is low, thereby lessening the negative impact on servicing the user's computing requirements from the update. It is noted for clarity that the user may provide different threshold criteria for different components (e.g., compute blade 403A, compute blade 403B) thereby possibly updating these different components with the same patch at different times. Furthermore, even if different components use the same threshold criteria, these components may be updated with the same patch at different times since the operation of each component is unique.

In some implementations, method 700 may include other and/or additional steps that, for clarity, are not depicted. Further, in some implementations, method 700 may be executed in a different order presented and that the order presented in the discussion of FIG. 7 is illustrative. Additionally, in some implementations, certain steps in method 700 may be executed in a substantially simultaneous manner or may be omitted.

An alternative to having the user provide user-specified thresholds for the usage statistics in connection with applying a patch is to have the user set-up a profile containing user-specified threshold criteria for the usage statistics ahead of time (prior to applying a patch) as discussed below in connection with FIG. 8.

FIG. 8 is a flowchart of a method 800 for updating hardware and software components of cloud computing environment 102 using a profile containing user-specified threshold criteria for the usage statistics of the hardware and software components in accordance with an embodiment of the present invention.

Referring to FIG. 8, in conjunction with FIGS. 1-6, in step 801, administrative server 302 monitors usage statistics of both the hardware components (e.g., network switches 401, storage controllers 402, compute blades 403) and software components of cloud computing environment 102.

In step 802, administrative server 302 receives an indication from the user to create a profile containing threshold criteria for updating the hardware and software components of cloud computing environment 102.

In step 803, administrative server 302 receives user-selected thresholds for the usage statistics of the hardware and software components, where the user-selected thresholds will be used to determine when to apply a patch. In one embodiment, the user-provided thresholds are defined using a time value. For example, a user-specified threshold may relate to updating a hardware/software component (e.g., firmware) when the processor utilization of compute blade 403 is below the average utilization by 20% over a five (5) minute period. Hence, if the processor utilization drops below the average utilization by 20% over the five (5) minute period, then it would be an optimal time to update the firmware on compute blade 403 according to the user.

In step 804, administrative server 302 creates a profile with the received user-selected thresholds.

In step 805, administrative server 302 applies the profile as to when to update the hardware and software components of cloud computing environment 102 with a user-provided patch, such as the patch provided to administrative server 302 in step 702 of method 700.

In step 806, a determination is made by administrative server 302 as to whether the threshold criteria in the profile for a monitored usage statistic of a hardware or software component has been met. If the threshold criteria for the monitored usage statistic of a hardware or software component has not been met, then administrative server 302 continues to determine whether the threshold criteria in the profile for a monitored usage statistic of a hardware or software component has been met in step 806.

If, however, the threshold criteria in the profile for a monitored usage statistic of a hardware or software component has been met, then, in step 807, administrative server 302 applies the user-provided patch to the hardware or software component of cloud computing environment 102 whose threshold criteria has been met. In this manner, by using user-specified threshold criteria for the monitored usage statistics, updates to hardware and software components of cloud computing environment 102 can occur at user-indicated optimal times, where the usage activity is low, thereby lessening the negative impact on servicing the user's computing requirements from the update. It is noted for clarity that the user may provide different threshold criteria for different components (e.g., compute blade 403A, compute blade 403B) thereby possibly updating these different components with the same patch at different times. Furthermore, even if different components use the same threshold criteria, these components may be updated with the same patch at different times since the operation of each component is unique.

In some implementations, method 800 may include other and/or additional steps that, for clarity, are not depicted. Further, in some implementations, method 800 may be executed in a different order presented and that the order presented in the discussion of FIG. 8 is illustrative. Additionally, in some implementations, certain steps in method 800 may be executed in a substantially simultaneous manner or may be omitted.

An alternative to using user-specified threshold criteria for the usage statistics in determining whether to update a component of cloud computing environment 102 (FIG. 1) is to have administrative server 302 (FIGS. 3 and 6) automatically update the hardware and software components of cloud computing environment 102 at minimum usage points (i.e., minimum levels of usage activity) as discussed below in connection with FIG. 9.

FIG. 9 is a flowchart of a method 900 for automatically updating hardware and software components of cloud computing environment 102 at determined minimum usage points in accordance with an embodiment of the present invention.

Referring to FIG. 9, in conjunction with FIGS. 1-6, in step 901, administrative server 302 monitors usage statistics of both the hardware components (e.g., network switches 401, storage controllers 402, compute blades 403) and software components of cloud computing environment 102 over a period of time (e.g., a week).

In step 902, administrative server 302 determines the minimum usage points of activity for the hardware and software components based on the monitored usage statistics over the period of time. For example, based on monitoring usage statistics of a compute blade 402, administrative server 302 may determine that the processor utilization of compute blade 402 is at a minimum usage point operating at 10% in the late evenings at 11:00 PM (EST) based on monitoring its activity over a period of time (e.g., a week). The determined minimum usage points of activity for the hardware and software components may be unique with respect to each other. Hence, a user-provided patch may be used to update different components at different times based on the components' determined minimal usage times.

In step 903, administrative server 302 updates the appropriate hardware and/or software components of cloud computing environment 102 with a user-provided patch at determined minimum usage points. As stated above, administrative server 302 may update different components at different times based on the components' determined minimal usage times. For example, the firmware on compute blade 402 may be updated at one time; whereas, the firmware on a different compute blade 402 may be updated at a different time with the same user-provided patch. In this manner, by having administrative server 302 determine components' minimal usage times, updates to the hardware and software components of cloud computing environment 102 can occur at optimal times, where the usage activity is low, thereby lessening the negative impact on servicing the user's computing requirements from the update.

In some implementations, method 900 may include other and/or additional steps that, for clarity, are not depicted. Further, in some implementations, method 900 may be executed in a different order presented and that the order presented in the discussion of FIG. 9 is illustrative. Additionally, in some implementations, certain steps in method 900 may be executed in a substantially simultaneous manner or may be omitted.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The invention claimed is:

1. A method for updating hardware and software components of a cloud computing environment, the method comprising:

monitoring usage statistics of said hardware and software components of said cloud computing environment, wherein said usage statistics are a collection of data relating to a usage or utilization of said hardware and software components of said cloud computing environment, wherein said usage statistics are used to determine minimum levels of activity of said hardware and software components and an optimal time to update said hardware and software components, wherein said monitored usage statistics comprise the following: processor utilization, memory utilization, number of virtual machines utilized, power utilization, temperature, disk utilization, volume utilization for individual virtual machines, port usages and virtual adapter usages;

presenting a user with a list of hardware and software components of said cloud computing environment to be updated with a patch in response to receiving an indication from said user to apply said patch;

receiving user-selected thresholds for usage statistics of one or more of said monitored hardware and software components to be used to determine when to apply said patch in response to said user not providing instructions to apply said patch immediately, wherein said user-selected thresholds for usage statistics of one or more of said monitored hardware and software components are received for those hardware and software components presented in said list in response to presenting said user said list of hardware and software components of said cloud computing environment to be updated with said patch;

receiving an indication from said user to create a profile containing threshold criteria for updating said hardware and software components of said cloud computing environment in response to updating said hardware and software components using said profile;

receiving said user-selected thresholds for usage statistics of one or more of said monitored hardware and software components to be used to determine when to apply said patch in response to updating said hardware and software components using said profile;

creating said profile with said received user-selected thresholds for usage statistics in response to updating said hardware and software components using said profile;

applying said profile as to when to update said one or more of said monitored hardware and software components with said patch; and applying, by a processor, said patch to a hardware or software component of said cloud computing environment in response to said monitored usage statistics of said hardware or software component meeting a user-selected threshold for said monitored usage statistics.

2. The method as recited in claim 1, wherein said user-selected thresholds are defined using a time value.

3. The method as recited in claim 1, wherein said hardware components comprises one or more of the following: storage controllers, network switches and physical compute machines.

4. A computer program product embodied in a non-transitory computer readable storage medium for updating hardware and software components of a cloud computing environment, the computer program product comprising the programming instructions for:

monitoring usage statistics of said hardware and software components of said cloud computing environment, wherein said usage statistics are a collection of data relating to a usage or utilization of said hardware and software components of said cloud computing environment, wherein said usage statistics are used to determine minimum levels of activity of said hardware and software components and an optimal time to update said hardware and software components, wherein said monitored usage statistics comprise the following: processor utilization, memory utilization, number of virtual machines utilized, power utilization, temperature, disk utilization, volume utilization for individual virtual machines, port usages and virtual adapter usages;

presenting a user with a list of hardware and software components of said cloud computing environment to be updated with a patch in response to receiving an indication from said user to apply said patch;

receiving user-selected thresholds for usage statistics of one or more of said monitored hardware and software components to be used to determine when to apply said patch in response to said user not providing instructions to apply said patch immediately, wherein said user-selected thresholds for usage statistics of one or more of said monitored hardware and software components are received for those hardware and software components presented in said list in response to presenting said user said list of hardware and software components of said cloud computing environment to be updated with said patch;

receiving an indication from said user to create a profile containing threshold criteria for updating said hardware and software components of said cloud computing environment in response to updating said hardware and software components using said profile;

receiving said user-selected thresholds for usage statistics of one or more of said monitored hardware and software components to be used to determine when to apply said patch in response to updating said hardware and software components using said profile;

creating said profile with said received user-selected thresholds for usage statistics in response to updating said hardware and software components using said profile;

applying said profile as to when to update said one or more of said monitored hardware and software components with said patch; and applying said patch to a hardware or software component of said cloud computing environment in response to said monitored usage statistics of said hardware or software component meeting a user-selected threshold for said monitored usage statistics.

5. The computer program product as recited in claim 4, wherein said user-selected thresholds are defined using a time value.

6. The computer program product as recited in claim 4, wherein said hardware components comprises one or more of the following: storage controllers, network switches and physical compute machines.

* * * * *